(12) United States Patent
Desloge (10) Patent No.: US 12,125,040 B2
(45) Date of Patent: Oct. 22, 2024

(54) SYSTEMS AND METHODS FOR CONSENSUS IN A BLOCKCHAIN NETWORK

(71) Applicant: Qwiti Holdings II, LLC, St. Louis, MO (US)

(72) Inventor: Christopher D. Desloge, St. Louis, MO (US)

(73) Assignee: Qwiti Holdings II, LLC, St. Louis, MO (US)

( * ) Notice: Subject to any disclaimer, the term of this patent is extended or adjusted under 35 U.S.C. 154(b) by 29 days.

(21) Appl. No.: 17/971,036

(22) Filed: Oct. 21, 2022

(65) Prior Publication Data

US 2023/0127714 A1    Apr. 27, 2023

Related U.S. Application Data

(60) Provisional application No. 63/389,644, filed on Jul. 15, 2022, provisional application No. 63/272,491, filed on Oct. 27, 2021.

(51) Int. Cl.
*G06F 7/00* (2006.01)
*G06F 16/23* (2019.01)
(Continued)

(52) U.S. Cl.
CPC ....... *G06Q 20/405* (2013.01); *G06F 16/2365* (2019.01); *G06F 16/27* (2019.01)

(58) Field of Classification Search
CPC .... G06F 16/27; G06F 16/2365; G06F 16/252; G06F 16/28; G06F 16/248;
(Continued)

(56) References Cited

U.S. PATENT DOCUMENTS 10,521,861 B1    12/2019 Ju et al.
11,861,619 B1 *  1/2024 Vijayaraghavan .......................... G06Q 20/3827

(Continued)

FOREIGN PATENT DOCUMENTS

CN    108614974 B    6/2021
KR    102096658 B1   4/2020
(Continued)

OTHER PUBLICATIONS

International Search Report and Written Opinion issued for International Patent Application No. PCT/US2022/047415, mailed Feb. 23, 2023, 10 Pages.

*Primary Examiner* — Mohammad A Sana
(74) *Attorney, Agent, or Firm* — Lewis Rice LLC (57) ABSTRACT

Systems and methods using blockchain technology to track and reconcile "collisions" on a blockchain network, where multiple nodes attempt to post data representations of the same transaction. Various techniques are used to determine which of the competing data representations shall be deemed correct and included in a block, such as proof-of-vote, endorsement, consent, and the use of an AI trained to examine supporting documentation and issue a confidence score as to which of competing values is most likely correct. Data tagging can be used to connect the granular level transactional data on the blockchain ledger to categories of information on summary documents to measure impacts of events, whether external or internal, accidental or program-based, on firm performance.

20 Claims, 3 Drawing Sheets

(51) Int. Cl.
*G06F 16/27* (2019.01)
*G06Q 20/40* (2012.01)

(58) Field of Classification Search
CPC ............ G06F 16/90332; G06Q 20/405; G06Q 20/3827; G06Q 20/3829; G06Q 20/085; G06Q 20/4016
See application file for complete search history.

(56) References Cited

U.S. PATENT DOCUMENTS

| | | |
|---|---|---|
| 2020/0193292 A1 | 6/2020 | Weng et al. |
| 2020/0327137 A1 | 10/2020 | Farver et al. |
| 2020/0394648 A1 | 12/2020 | Blackshear et al. |
| 2021/0056095 A1 | 2/2021 | Srivastava |
| 2021/0117860 A1 | 4/2021 | Ergen |
| 2021/0241241 A1* | 8/2021 | Lokanath ............. G06Q 20/065 |
| 2021/0243193 A1* | 8/2021 | Padmanabhan ....... G06F 16/252 |
| 2022/0318788 A1* | 10/2022 | Dalton ............... G06Q 20/0658 |
| 2023/0098747 A1* | 3/2023 | Vijayaraghavan ... G06Q 20/085 |
| | | 705/69 |

FOREIGN PATENT DOCUMENTS

| | | |
|---|---|---|
| KR | 20200056314 A | 5/2020 |
| KR | 102290481 B1 | 8/2021 |
| WO | 2018224431 A1 | 12/2018 |
| WO | 2020073301 A1 | 4/2020 |
| WO | 2020256998 A1 | 12/2020 |
| WO | 2021165756 A1 | 8/2021 |
| WO | 2021184981 A1 | 9/2021 |

* cited by examiner

SYSTEMS AND METHODS FOR CONSENSUS IN A BLOCKCHAIN NETWORK

CROSS-REFERENCE TO RELATED APPLICATIONS

This application claims the benefit of U.S. Prov. Pat. App. Ser. No. 63/272,491, filed Oct. 27, 2021, and U.S. Prov. Pat. App. Ser. No. 63/389,644, filed Jul. 15, 2022. The entire disclosures of both of these references are incorporated herein by reference.

BACKGROUND OF THE INVENTION

Field of the Invention

This disclosure is related to the field of blockchain networks. In particular, it relates to techniques for harmonizing and reconciling attempts to write conflicting data to a blockchain ledger.

Description of the Related Art

The emergence and commercial acceptance of blockchains and related cryptographic technology provides unique opportunities to solve age-old problems. The blockchain is itself a solution to various long-standing problems with implementing a digital currency, notably the double-spending problem, which is itself the product of the lack of a trusted mediator.

With a government-backed fiat currency, physical notes and banks provide this function. If a person has a $100 note and buys a product, he or she must physically transfer the $100 note to the seller and cannot spend it again. For deposit accounts, if the person has a $100 balance and attempts to spend it twice, the bank will check the balance in the bank's ledger and honor only one of the two attempted transactions. The other will be declined (or subjected to overdraft procedures in which the depositor is typically fined or penalized to discourage such activities).

The Internet has long had digital currencies but lacked a trusted mediator. For example, on-line games and other network-based applications have had digital currencies of various forms since at least the 1980s. The host or publisher of the game or application served as the de facto mediator. However, such mediators are inherently untrustworthy. They, and the digital economies they oversee, are not subject to the transparency or oversight of publicly regulated financial institutions. This can result in fraud, theft, embezzlement, and errors that are difficult or impossible to detect or correct. Further, if the application is discontinued, the ledger balances held by the user community simply vanish. Further, the currencies are not generalized, and are only usable within a closed economy to purchase the limited assets that the publisher chooses to make available.

However, implementing a true generalized digital currency requires a mediator to prevent the double-spend problem. It is inherent in the nature of digital assets that they are infinitely reproducible, usually at little or no marginal cost or loss of quality. Nothing stops a person who claims to own a unit of digital currency—which is simply data—from making multiple copies of it and spending it multiple times.

Blockchains solve this problem by creating a public ledger of transactions that is maintained and updated in a decentralized manner that provides a shared view of all valid or accepted transactions, yet the public ledger is not in the control or custody of any one person. In this system, if a person attempts to double-spend a digital currency, once the first transaction has been accepted, all participants in the system have knowledge of it and can refuse to accept or process any second, double-spend attempt as an invalid transaction.

Blockchain systems achieve this through algorithmic consensus-formation, which provide a decentralized, programmatic method for the disparate nodes on a blockchain network to agree on which blocks are valid, and which are not. Such algorithms are a common feature in any distributed computing or multi-agent system. For example, in a relational database management system, multiple clients may simultaneously attempt to add, delete, update, or override the same data. The database software must have some way of determining which transactions will be committed and carried out, and in which order, and which must be declined.

In blockchains, it will often be the case that multiple valid solutions are discovered at about the same time, and some nodes on the blockchain work on the next block in one branch, and other nodes work on the next block in another branch. This is known as a "fork," and the consensus algorithm determines which branch is "correct", causing other nodes to abandon and discard the otherwise valid blocks of the disfavored branch, and work on the next block in the consensus branch.

This process is computationally intensive and requires powerful computers. This costs money, as the computers performing the validation consume electricity and divert processing power from other productive uses. To incentivize users to attempt these calculations, the person who discovers the next valid block is rewarded, typically with an amount of cryptocurrency. Thus, the process of finding the next block both prevents a double-spend attack and provides for transaction validation and self-mediating currency generation.

Another issue is prioritization. Because there may be a large pool of unconfirmed transactions that could be potentially included in the next block, the sender of a transaction may optionally include a transaction fee. This fee is an amount paid to the miner who successfully validates the next block including that transaction, incentivizing miners to prioritize a given transaction in the next block. The higher the fee, the higher priority the miners will generally place on including the transaction in the next block.

Although blockchains are a promising technology, existing consensus-forming algorithms are not without their drawbacks. While blockchains may appear to be a natural solution to various real-world transactional challenges, the real world does not always map neatly to blockchain networks. This is in part because consensus-forming algorithms, particularly in public blockchains, are premised upon the decentralized nature of the blockchain as a ledger system. The consensus-forming aspect is democratic, automatic, and emergent. However, it is also arbitrary and agnostic. Any number of possible valid solutions for the next block could be discovered, and the accepted solution is not based on a substantive examination of the content, data, or transactions in the block, nor on the identity or role of the node that discovered it. While this is generally regarded as a feature by blockchain enthusiasts, it presents practical technical challenges to the adoption of blockchain technologies in certain settings.

For example, consider a field one might intuitively expect to be a natural fit for blockchain: finance. Enterprises generate a great deal of data about their operations, ranging from granular, transaction-level data (e.g., revenues, expenses, inventory) to formal summaries, such as profit-and-loss statements and other financial statements. Since most firms are interconnected with other enterprises (or internal business units, affiliates, or other structures), it is desirable to ensure that related enterprises share a common view of their operational data. However, this goal, a principle known in computer science as a "single source of truth," has proven elusive. Different enterprises or business units may track similar data differently, and may regard the manner in which real-life events impact and change the data differently.

This need may appear to be solved by the consensus-forming aspect of blockchains, but it is not enough that the consensus merely be formed. Rather, that consensus should be formed around the best available data. In this sense, the arbitrary and agnostic consensus-forming of blockchains is a liability, not an asset, and it renders prior art blockchain networks unsuitable for such data. Rather, it is desirable that the source, quality, and validity of a proposed transaction (or other data) be explored, validated, and verified, and that the consensus algorithm take into account not merely the existence of data that a participant in the blockchain network desires to have validated, but the quality of it.

Thus, what is needed in the art are systems and methods for blockchain consensus-forming in which the source, quality, validity, and/or verifiability of proposed transactions can be taken into consideration in forming consensus as to which unverified transactions will be processed and accepted, including where there exist multiple conflicting unverified transactions that cannot all be accepted.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a method for resolving data collisions on a blockchain comprising: providing a blockchain network comprising a blockchain operating in accordance with a set of consensus formation rules; providing a first node of a first firm, the first node being a node of the blockchain network communicably coupled to a first firm database comprising transactional data for the first firm; providing a second node of a second firm, the second node being a node of the blockchain network communicably coupled to a second firm database comprising transactional data for the second firm; providing an audit node of an artificial intelligence (AI) auditor module, the audit node being a node of the blockchain network and the AI auditor module comprising a plurality of AI models, each AI model in the plurality of AI models trained to audit transactional data for a type of quantification; the first node posting to the blockchain network a first data representation of a transaction between the first firm and the second firm, the first data representation comprising: a first value of the transaction selected from the first firm database; a unique identifier of the transaction; a unique identifier of a parent transaction for the transaction; and a data tag for a quantification associated with the transaction; the second node posting to the blockchain network a second data representation of the transaction, the second data representation comprising: a second value of the transaction selected from the second firm database; the unique identifier of the transaction; the unique identifier of the parent transaction for the transaction; and the data tag for the quantification associated with the transaction; receiving, at the first node, the second data representation; receiving, at the second node, the first data representation; receiving, at the audit node, the first data representation and the second data representation; and at each of the first node, the second node, and the audit note, selecting one of the first data representation and the second data representation for inclusion on the blockchain, the selecting using the consensus formation rules.

In an embodiment of the method, the selecting using the consensus formation rules comprises: determining whether the first value differs from the second value; and if the determining determines that the first value does not differ from the second value, selecting either the first data representation or the second data representation for inclusion on the blockchain.

In a further embodiment of the method, the determining determines that the first value differs from the second value.

In a further embodiment of the method, the selecting using the consensus formation rules further comprises: the first node transmitting to the blockchain network an indication of first node consenting to the second value; and selecting the second data representation for inclusion on the blockchain.

In a further embodiment of the method, the selecting using the consensus formation rules further comprises: the second node transmitting to the blockchain network an indication of second node consenting to the first value; and selecting the first data representation for inclusion on the blockchain.

In a further embodiment of the method, the consensus formation rules comprise an endorsement by the AI audit module; and the selecting using the consensus formation rules further comprises: at the audit node, the AI audit module transmitting to the blockchain network an indication of the AI audit module's endorsement of the first data representation; and selecting the first data representation for inclusion on the blockchain.

In a further embodiment of the method, the method further comprise, before the AI audit module transmitting to the blockchain network an indication of the AI audit module's endorsement of the first data representation: the AI audit module receiving a first set of image data comprising images of supporting documentation for the first data representation; the AI audit module generating a first confidence score for the first data representation, the first confidence score based on the received first set of image data; the AI audit module receiving a second set of image data comprising images of supporting documentation for the second data representation; the AI audit module generating a second confidence score for the second data representation, the second confidence score based on the received second set of image data.

In a further embodiment of the method, the AI audit module transmits to the blockchain network an indication of the AI audit module's endorsement of the first data representation only if the first confidence score exceeds a predefined minimum confidence threshold and only if the second confidence score does not exceed the predefined minimum confidence threshold.

In a further embodiment of the method, the selecting using the consensus formation rules further comprises determining to compare the first data representation and second data representation from among a plurality of data representations, the plurality including the first data representation and second data representation, by comparing the unique identifier of the transaction in each of the first data representation and second data representation.

In a further embodiment of the method, the selecting using the consensus formation rules further comprises determining to compare the first data representation and second data representation from among a plurality of data representations, the plurality including the first data representation and second data representation, by comparing the data tag for the quantification associated with the transaction in each of the first data representation and second data representation.

In a further embodiment of the method, the selecting using the consensus formation rules further comprises: creating a first fork on the blockchain, the first fork including a block comprising the first data representation and the block not comprising the second data representation; and creating a second fork on the blockchain, the second fork including a block comprising the second data representation and the block not comprising the first data representation.

In a further embodiment of the method, the method further comprises: providing a third node of a third firm, the third node being a node of the blockchain network communicably coupled to a third firm database comprising transactional data for the third firm; the third node posting to the blockchain network a data representation of a second transaction, the data representation comprising: a first value of the second transaction selected from the third firm database; a unique identifier of the second transaction; a unique identifier of a parent transaction for the second transaction, the parent transaction being the transaction and the unique identifier of the parent transaction being the unique identifier of the transaction; and a data tag for a quantification associated with the second transaction; receiving, at the first node, the data representation; receiving, at the second node, the data representation; receiving, at the audit node, the data representation; and the selecting one of the first data representation and the second data representation for inclusion on the blockchain, the selecting using the consensus formation rules further comprising: comparing the unique identifier of the parent transaction for the second transaction to the unique identifier of the transaction in the first data representation and the second data representation; based on the comparing, determining that the transaction is a parent transaction of the second transaction; only if the value for the second transaction in the data representation is equal to the first value in the first data representation, continuing the first fork and discontinuing the second fork; and only if the value for the second transaction in the data representation is equal to the second value in the second data representation, continuing the second fork and discontinuing the first fork.

In a further embodiment of the method, the set of consensus formation rules includes a transaction fee bidding rule.

In a further embodiment of the method, the first data representation further comprises a transaction fee amount for the first data representation; the selecting using the consensus formation rules further comprises: the second node transmitting to the blockchain network an indication of second node consenting to the first value; and selecting the first data representation for inclusion on the blockchain; and the second firm receiving the transaction fee.

In a further embodiment of the method, the second data representation further comprises a transaction fee amount for the second data representation; the selecting using the consensus formation rules further comprises: the first node transmitting to the blockchain network an indication of first node consenting to the second value; and selecting the second data representation for inclusion on the blockchain; and the first firm receiving the transaction fee.

In a further embodiment of the method, the first data representation further comprises a first transaction fee amount for the first data representation; the second data representation further comprises a second transaction fee amount for the second data representation; and the selecting using the consensus formation rules further comprises: only if the first transaction fee amount is greater than the second transaction fee amount, selecting the first data representation for inclusion on the blockchain and the second firm receiving the first transaction fee; and only if the second transaction fee amount is greater than the first transaction fee amount, selecting the second data representation for inclusion on the blockchain and the first firm receiving the second transaction fee.

In a further embodiment of the method, the set of consensus formation rules includes two or more members of the group consisting of: comparison to prior accepted block data; comparison to later arriving block data; consent; manual audit; artificial intelligence audit; transaction fee bidding; endorsement; and proof-of-vote.

In a further embodiment of the method, the blockchain network operates via a telecommunications network.

In a further embodiment of the method, the blockchain network is a private blockchain network.

In a further embodiment of the method, the blockchain is selected from the group consisting of: a federated blockchain; a consortium blockchain; and a hybrid blockchain.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

At a high level of abstraction, the systems and methods described herein use blockchain technology to track and reconcile "collisions" on a blockchain network, meaning attempts to post conflicting data representations of a real-world transaction, usually caused by conflicting source data from disparate databases held and managed by disparate firms or units. The data represents the same transaction but the different databases have different, conflicting records of the transaction. In such circumstances, various techniques may be used to determine which of the competing data representations shall be deemed correct and included in a block. Thereafter, absent a hard fork, participating nodes must, for purposes of the shared operational view of the data in question, accept the correctness of the transaction as represented in the accepted block and proceed to process further blocks (and transactions) based on that presumption of correctness. These and other aspects are described in further detail herein. It should be noted that the exemplary embodiments described herein present one way of organizing these functions, but other combinations are possible and vary from embodiment to embodiment depending on the particular needs of the use case.

Throughout this disclosure, various technological and other terms may be used. The following paragraphs provide guidance on the application and interpretation of these terms in general, but a person of ordinary skill in the art will understand that these and other terms in computers and telecommunications are often used in a casual and imprecise manner, especially when used colloquially or informally. The proper definition may vary contextually, and may not necessarily be identical to how these terms are used colloquially or even in other technical fields.

The term "computer" means a device or system that is designed to carry out a sequence of operations in a distinctly and explicitly defined manner, usually through a structured sequence of discrete instructions. The operations are frequently numerical computations or data manipulations, but also include input and output. The operations with the sequence often vary depending on the particular data input values being processed. The device or system is ordinarily a hardware system implementing this functionality using digital electronics, and, in the modem era, the term is most closely associated with the functionality provided by digital microprocessors. The term "computer" as used herein without qualification ordinarily means any stored-program digital computer, including any of the other devices described herein which have the functions and characteristics of a stored-program digital computer.

This term is not necessarily limited to any specific type of device, but instead may include computers, such as, but not necessarily limited to: processing devices, microprocessors, controllers, microcontrollers, personal computers, desktop computers, laptop computers, workstations, terminals, servers, clients, portable computers, handheld computers, cell phones, mobile phones, smart phones, tablet computers, server farms or clusters, hardware appliances, minicomputers, mainframe computers, video game consoles, handheld video game products, smart watches, and the like. It will also be understood that certain devices not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, printers (which often have built-in server software), file servers, NAS and SAN, and other hardware capable of interacting with the systems and methods described herein in the matter of a computer.

A person of ordinary skill in the art will also understand that the generic term "computer" is often used to refer to an abstraction of the functionality provided by a computer, and is generally assumed to include other elements, depending on the particular context in which the term is used. By way of example and not limitation, a laptop "computer" would be understood as including a pointer-based input device, such as a mouse or track pad, in order for a human user to interact with an operating system having a graphical user interface. However, a "server" computer may not necessarily have any directly connected input hardware, but may have other hardware elements that a laptop computer usually would not, such as redundant network cards, power supplies, or storage systems.

A person of ordinary skill in the art will also understand that functions ascribed to a "computer" may be distributed across a plurality of machines, and that any such "machine" may be a physical device or a virtual computer. A person of ordinary skill in the art will also understand that there are multiple techniques and approaches for distribution of processing power. For example, distribution may be functional, as where specific machines in a group each perform a specific task (e.g., an authentication machine, a load balancer, a web server, an application server, etc.). By way of further example, distribution may be balanced, such as where each machine is capable of performing most or all functions of any other machine and is assigned tasks based on resource availability at a point in time. Thus, the term "computer" as used herein, can refer to a single, standalone, self-contained device, a virtual device, or to a plurality of machines (physical or virtual) working together or independently, such as a server farm, "cloud" computing system, software-as-a-service, or other distributed or collaborative computer networks.

The term "program" means the sequence of instructions carried out on a computer. Programs may be wired or stored, with programs stored on a computer-readable media being more common. When executed, the programs are loaded into a computer-readable memory (e.g., random access memory) and the program's instructions are then provided to a central processing unit to carry out the instructions.

The term "software" is a generic term for those components of a computer system that are "intangible" and not "physical." This term most commonly refers to programs executed by a computer system, as distinct from the physical hardware of the computer system, though it will be understood by a person of ordinary skill in the art that the program itself does physically exist. The broad term "software" encompasses both system software—essential programs necessary for the basic operation of the computer itself—as well as application software, which is software specific to the particular role performed by a computer. The term "software" thus usually implies a collection or combination of multiple programs for performing a task, and includes all forms of the programs—source code, object code, and executable code. The term "software" may also refer generically to a specific program or subset of program functionality relevant to a given context. For example, on a smart phone, a single application may be out of date and requiring updating. The phrase "update the software" in this context would be understood as meaning download and install the current version of the application in question, and not, for example, to update the operating system. However, if a new version of the operating system was available, the same phrase may refer to the operating system itself, optionally with any application programs that also require updating for compatibility with the new version of the operating system.

The term "media" means a computer-readable medium to which data may be stored and from which data may be retrieved. Such storage and retrieval may be accomplished using any number of technical means, including, without limitation, electronic, magnetic, optical, electromagnetic, infrared, or semiconductor systems, apparatus, or devices. Various types of media are commonly present in a computer, including hard disks, random access memory (RAM), read-only memory (ROM), erasable programmable read-only memory (EPROM or Flash memory), as well as portable media such as diskettes, compact discs, thumb drives, and the like. It should be noted that a computer-readable medium could, in certain contexts, be understood as including signal media, such as a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer readable storage medium and that can communicate, propagate, or transport a program for use by or in connection with an instruction execution system, apparatus, or device. However, except and unless specifically qualified otherwise, the term "media" as used herein should be understood as excluding signal media and referring to tangible, non-transitory, computer-readable media.

The term "network" is susceptible of multiple meanings depending on context. In communications, the term generically refers to a system of interconnected nodes configured for communication (e.g., exchanging data) with each other, such as over physical lines, wireless transmission, or a combination of the two. In computing, networks are usually collections of computers and special-purpose network devices, such as routers, hubs, and switches, exchanging data using various protocols. The term may refer to a local area network, a wide area network, a metropolitan area network, or any other telecommunications network. When used without qualification, the term should be understood as encompassing any voice, data, or other telecommunications network over which computers communicate with each other. This meaning should be understood as being distinct from the term "network" in mathematics, in which case it refers to a graph or set of objects, nodes, or vertices connected by edges or links. For example, a "neural network" in computer science uses the mathematical meaning, not the communication meaning, though there is some conceptual overlap between the two.

The term "server" means a computer (and/or software) on a network that provides a service to other computers (and/or software) connected to the network. The meaning of this term has evolved over time and at one time referred to a specific class of high-performance hardware on a local area network, but the term is now used more generally to refer to any computer (and/or software) providing a service over a network.

The term "client" means a computer (and/or software) on a network that accesses, receives, or uses a service provided by a server connected to the network.

The terms "server" and "client" may refer to hardware, software, and/or a combination of hardware and software, depending on context. Those having ordinary skill in the art will appreciate that the terms "server" and "client" in network theory essentially mean corresponding endpoints of network communication or network connections, typically (but not necessarily limited to) a socket. Those having ordinary skill in the art will further appreciate that a "server" may comprise a plurality of software and/or hardware servers working in combination to deliver a service or set of services. Likewise, a "client" may be a device accessing a server, software on a client device accessing a server, or (most often) both. Those having ordinary skill in the art will further appreciate that the term "host" may, in noun form, refer to an endpoint of a network communication or network (e.g., "a remote host"), or may, in verb form, refer to a server providing a service over a network ("host a website"), or an access point for a service over a network.

The terms "artificial intelligence" and "AI" refer broadly to a discipline in computer science concerning the creation of software that performs tasks requiring the reasoning faculties of humans. In practice, AIs lack the ability to engage in the actual exercise of reasoning in the manner of humans, and AIs might be more accurately described as "simulated intelligence." This "simulated intelligence" is contextual, and usually narrowly tailored to one, or a very small number, of well-defined tasks (such as recognizing a human face in an image). A common implementation of AI is supervised machine learning, wherein a model is trained by providing multiple sets of pre-classified input data, with each set representing different desired outputs from the AI's "reasoning" (e.g., one set of data contains a human face, and one set doesn't). The AI itself is essentially a sophisticated statistical engine that uses mathematics to identify and model data patterns usually appearing within one set but not the other. This process is known as "training" the AI. Once the AI is trained, new (unclassified) data is provided to it for analysis, and the software assesses, in the case of a supervised machine learning model, which label best fits the new input, and often also provides a confidence level in the prediction. A human supervisor may provide feedback to the AI as to whether it was right or not, and this feedback may be used by the AI to refine its models further. In practice, adequately training an AI to operate in a real-world production environment requires enormous sets of training data, which are often difficult, laborious, and expensive to develop, collect, or acquire. Each discrete task that an AI is trained to perform may be referred to herein as a "model."

The term "database" means a computer-accessible, organized collection of data. Databases have been used for decades to format, store, access, organize, and search data. Traditionally, databases were stored on a single storage medium controlled by a single computer, such as a fixed disk or disk array. However, databases may also be organized in a "distributed" fashion, wherein the database is stored on a plurality of storage devices, not all of which are necessarily operated by a common processor. Instead, distributed databases may be stored in multiple component parts, in whole or part, dispersed across a network of interconnected computers.

The following blockchain definitions generally apply to this disclosure and should be understood in both the context of client/server computing generally, as well as the particular environment of a blockchain network. These definitions, and other terms used herein, should also be understood in the context of leading white papers pertaining to the subject matter. These include, but are not necessarily limited to, *Bitcoin: A Peer-to-Peer Electronic Cash System* (Satoshi Nakamoto 2008). It will be understood by a person of ordinary skill in the art that the precise vocabulary of blockchains is not entirely settled, and although the industry has established a general shared understanding of the meaning of the terms, reasonable variations may exist.

The term "blockchain" means a distributed database system comprising a continuously-growing list of ordered records ("blocks") shared across a network. In a typical embodiment, the blockchain functions as a transaction ledger.

The term "blockchain network" means the collection of nodes interacting via a particular blockchain protocol and rule set.

The term "block" means a record in a continuously-growing list of ordered records that comprise a blockchain. In a typical embodiment, a block comprises at least a collection of confirmed and validated transactions.

The term "consensus" refers to a computational agreement among nodes in a blockchain network as to the content and order of blocks in the blockchain.

The term "fork" means a split in a blockchain where two different valid successor blocks are present in the blockchain, but consensus has not yet been reached as to which is correct. This type of fork is referred to as a "soft fork," and is automatically resolved by consensus over time. A "hard fork" is the forced imposition of a fork by manual intervention to invalidate prior blocks/transactions, typically via a change to the blockchain rules and protocol.

The term "ledger" means the append-only records stored in a blockchain. The records are immutable and may hold any type of information, including financial records and software instructions.

The term "node" means each copy of the ledger in the blockchain network, or the machine, person, or entity holding such copy.

The term "quantification" means a data value or numeric representation of a discrete and quantifiable fact, generally pertaining to assets. Examples of quantifications include the amount of a product held in inventory by a firm, the number of employees in a business unit, the amount of money paid for a service, and so forth.

Figure 1:
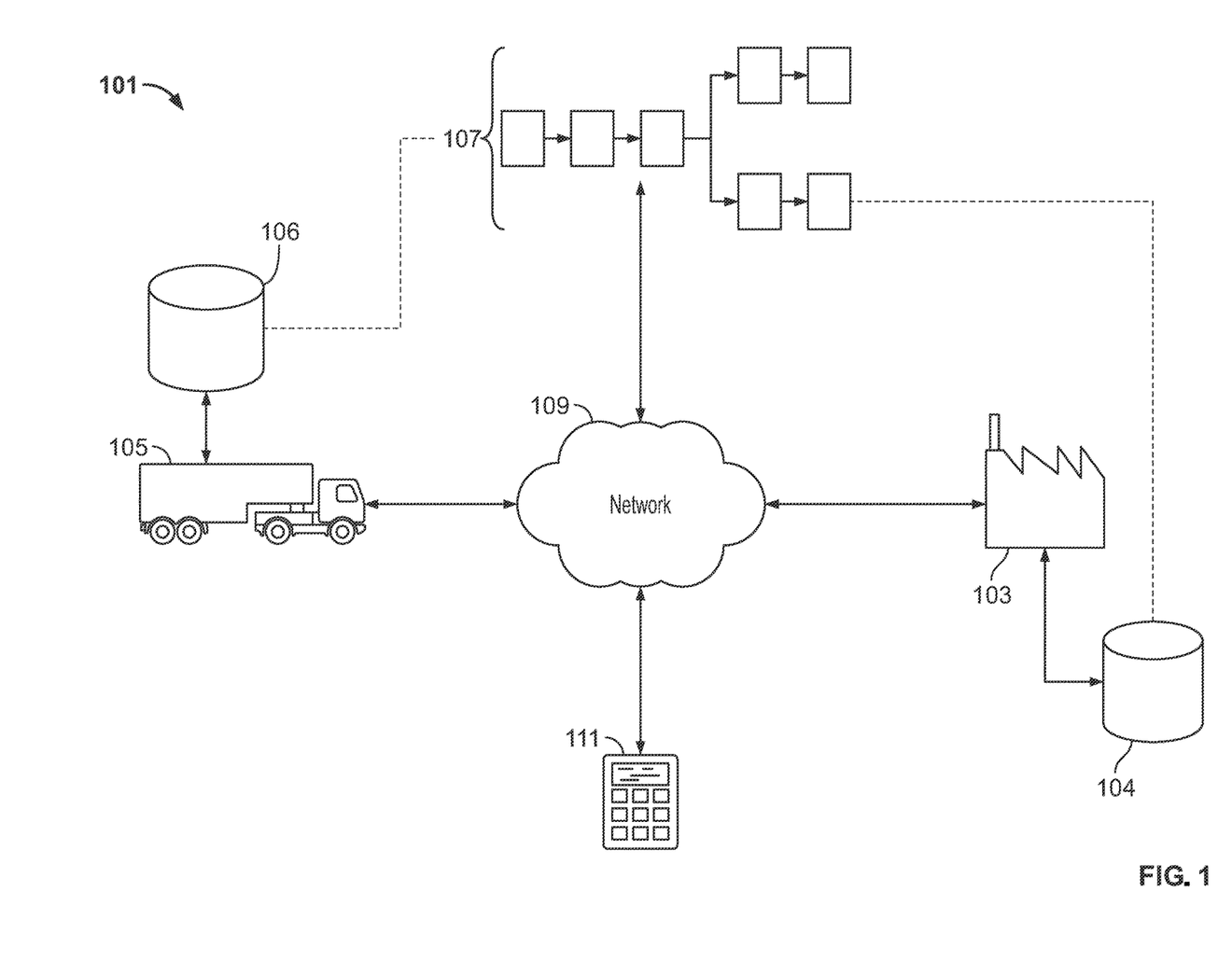
FIG. 1 depicts an embodiment of a blockchain network according to the present disclosure.

FIG. 1 is an illustrative, non-limiting schematic depiction of an embodiment (101) of a system according to the present disclosure, suitable for carrying out the methods described herein. In the depicted embodiment (101) of FIG. 1, a plurality of firms (103) and (105) are shown in communication over a network (109). Each firm (103) and (105) maintains its own private database (104) and (106) of transactional data about its operations and activities. Generally, for practical business reasons, these databases (104) and (106) are maintained in confidence because the data in them is regarded as sensitive, private information about the company's (103) and (105) operations. Also depicted in FIG. 1 is a blockchain (107). The blockchain (107) is depicted as a schematically distinct element from the firms (103) and (105), but it will be understood that this is a simplification for visual representation only. In reality, each firm (103) and (105) participating in the blockchain network has at least one computer (node) which possesses a copy of the blockchain and updates and maintains that copy in accordance with the applicable blockchain protocol and rules. As such, the references to the interactions of firms with each other and the blockchain throughout this disclosure refer to a node computer representing that firm (or unit) on the blockchain network.

Figure 2:
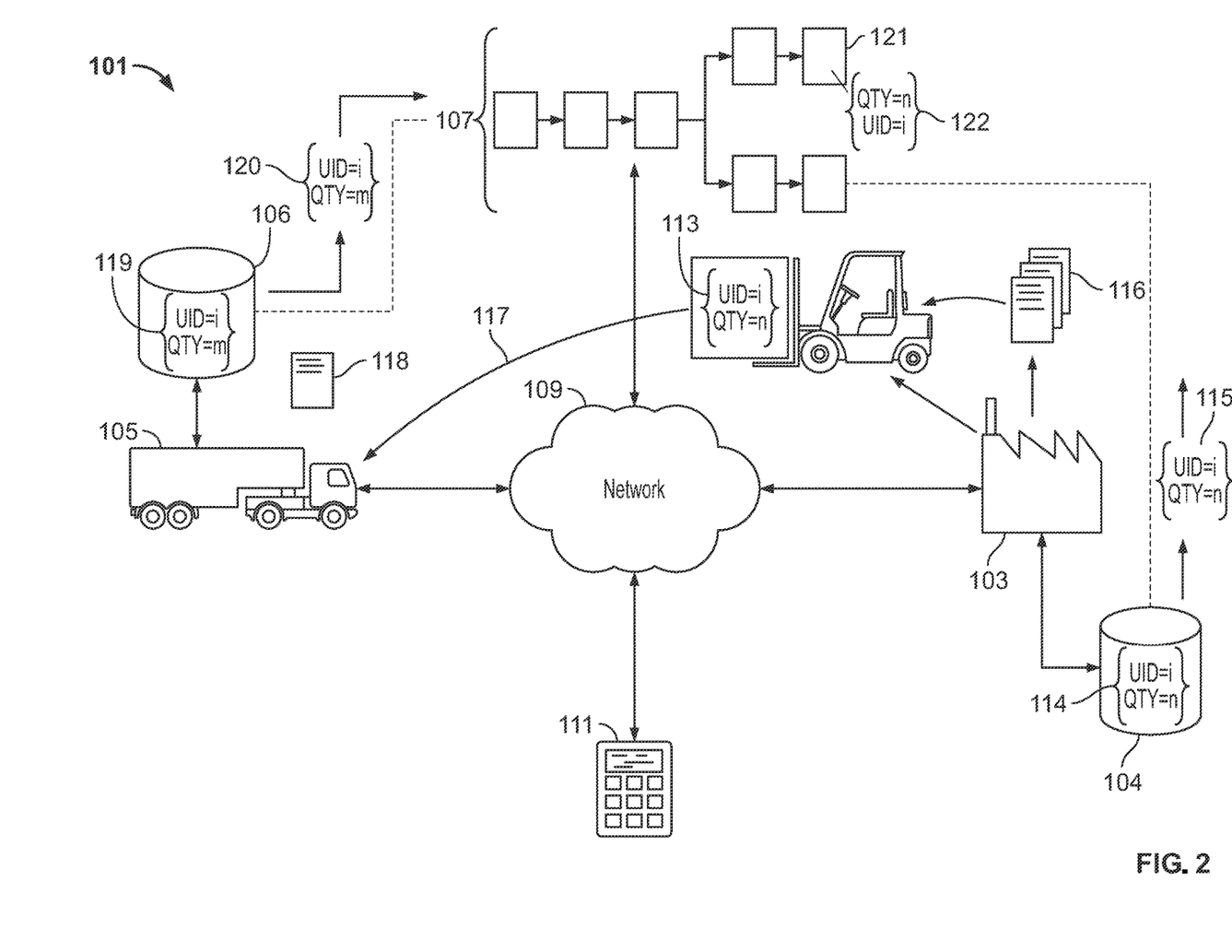
FIG. 2 depicts a further embodiment of a blockchain network according to the present disclosure having a conflicting transaction.

In the depicted embodiment (101) of FIG. 1, at least some of the transactional data (104) and (106) for the respective firms (103) and (105) is representative of the same transaction. For example, as shown in FIG. 1, if the first firm (103) is a manufacturer (103) and the second firm (105) is as shipper (105). The manufacturer (103) may transfer a quantity of products (113) to the shipper (105) for shipment or distribution. Generally, the manufacturer (103) will create a transactional record (114) in its database (104) representing the transfer of these products (113) to the shipper (105). As shown in FIG. 2, this transaction (114) has an associated quantity n of the product (113).

Generally, this transaction (114) will also be documented by each (or both) firms (103) and (105) in some fashion through ordinary business documentation (116) and (118), such as a quote, purchase order, invoice, receipt, bill of lading, and the like, which contain data relevant to the transaction, such as the quantity of products (113) in the depicted example. The two firms (103) and (105) may maintain different sets of documentation (116) and (118) about the transaction. That is, the manufacturer (103) may have one set of transactional documentation (116) and the shipper (105) may have a second set of transactional documentation (118). These two sets of documentation (116) and (118) may be identical, may overlap only in part, or may be completely different.

The shipper (105) may also record transactional data (119) about the shipment in its own database (106), including data such as the quantity of product (113) received. This quantity data (119) should, ideally, match the quantity of product shipped as reflected in the manufacturer's (103) database (105). However, in practice, this does not always happen for any number of various reasons. The quantity shipped may have been erroneously entered into the manufacturer's (103) database (104) by an employee, or the quantity received may be have been erroneously entered into the shipper's (105) database (106) by its employee. Alternatively, the expected quantity shipped may have been entered, but the palette of products (113) might have been loaded incorrectly and too many or too few products (113) were provided. Whatever the cause, in the depicted embodiment, the quantity m recorded by the shipper (105) in its database (106) differs from the quantity n recorded by the manufacturer (103) in its database (104).

Because this transaction is a shared transaction, both firms (103) and (105) attempt to write their data representation of the transaction (114) and (119), respectively, to the blockchain (107). As shown in FIG. 2, the manufacturer (103) attempts to write (115) a transaction reflecting a quantity of n, and the shipper (105) attempts to write (120) a transaction reflecting a quantity of m. Under normal blockchain operations, each firm (103) and (105), acting as a node on the blockchain (107), receives the proposed, unvalidated transaction from the other. If the data is identical, there is no collision. That is, if both firms (103) and (105) had attempted to write a quantity of n, for the same transaction, consensus exists and the transaction data (122) is added to the next block (121) on the blockchain (107).

However, if the data conflicts, only one of the two representations of the transaction can be added, as they are mutually exclusive. In such circumstances, a consensus or decisional process is used to determine which of the two competing proposed data representations (114) and (119) of the transaction will be added to the blockchain (107). Examples and descriptions of such processes are described elsewhere herein. In the depicted embodiment of FIG. 2, the first firm's (103) data (114) is chosen, and its data representation (122) of the transaction is added to the next block (121) in the chain, and will be used to validate any further related transactions that are dependent upon that data.

Although in this exemplary embodiment, the shipper's (105) data representation was not chosen, the shipper (105) may or may not update its private database (119) to reflect the results of the collision resolution. That is, the data representation (119) in the shipper's (105) database (106) may continue to reflect a received quantity of m. There are any number of reasons why an firm may choose to maintain such data, including consistency with other internal data systems or for internal business purposes, such as reporting, tax and audit, and the like. Alternatively, the shipper (105) may choose to update its internal database (106) to reflect the accepted number. Whether, and in what circumstances, a given firm updates its internal database to match the blockchain is a function of individual firm policies, practices, and preferences. However, as further described elsewhere herein, it is generally preferred and expected that the prevailing data on the blockchain (107) will be auditably confirmed as being the correct (or at least most accurate) data, and all participating nodes will update and maintain their own internal databases consistently with the blockchain (107). In any event, for any future transactions affecting the firms (103) and (105) that require reference to this transaction, the accepted value in the blockchain (107) will be used. In this fashion, previously accepted data can be used to validate future transactions.

The particular process for resolving collisions may vary from embodiment to embodiment depending on the particular needs of the blockchain (107) in question. Examples of various techniques for resolving collisions are provided herein, any one or more of which may be used, alone or in combination with one or more others, to resolve conflicting data in a given embodiment.

Generally, the first collision resolution step taken is to examine already-accepted transactions on the blockchain (107) for related data or transactions which indicate that one of the conflicting values must be used. For example, if the transaction in question is a 50% refund, a prior accepted transaction may exist on the blockchain (107) reflecting the original amount paid, from which the correct amount of the 50% refund can be calculated. If one node submits a number that reflects 50% of the prior transaction amount, and the other does not, the proposed number that is consistent with the prior accepted transaction may be used, and no further validation or resolution is needed.

Similarly, it may be possible in some embodiments to "hold" disputed transactions for a period of time to determine whether later-arriving data resolves the collision, and use the soft forking capability of the blockchain (107) to simultaneously maintain two or more possible sets of valid transaction data. Once later-arriving data confirms the correctness of one number over the other, the blockchain (107) rules may require that nodes accept the fork containing that number and discard the other. This is shown in FIG. 3, which continues the example of FIG. 2.

Figure 3:
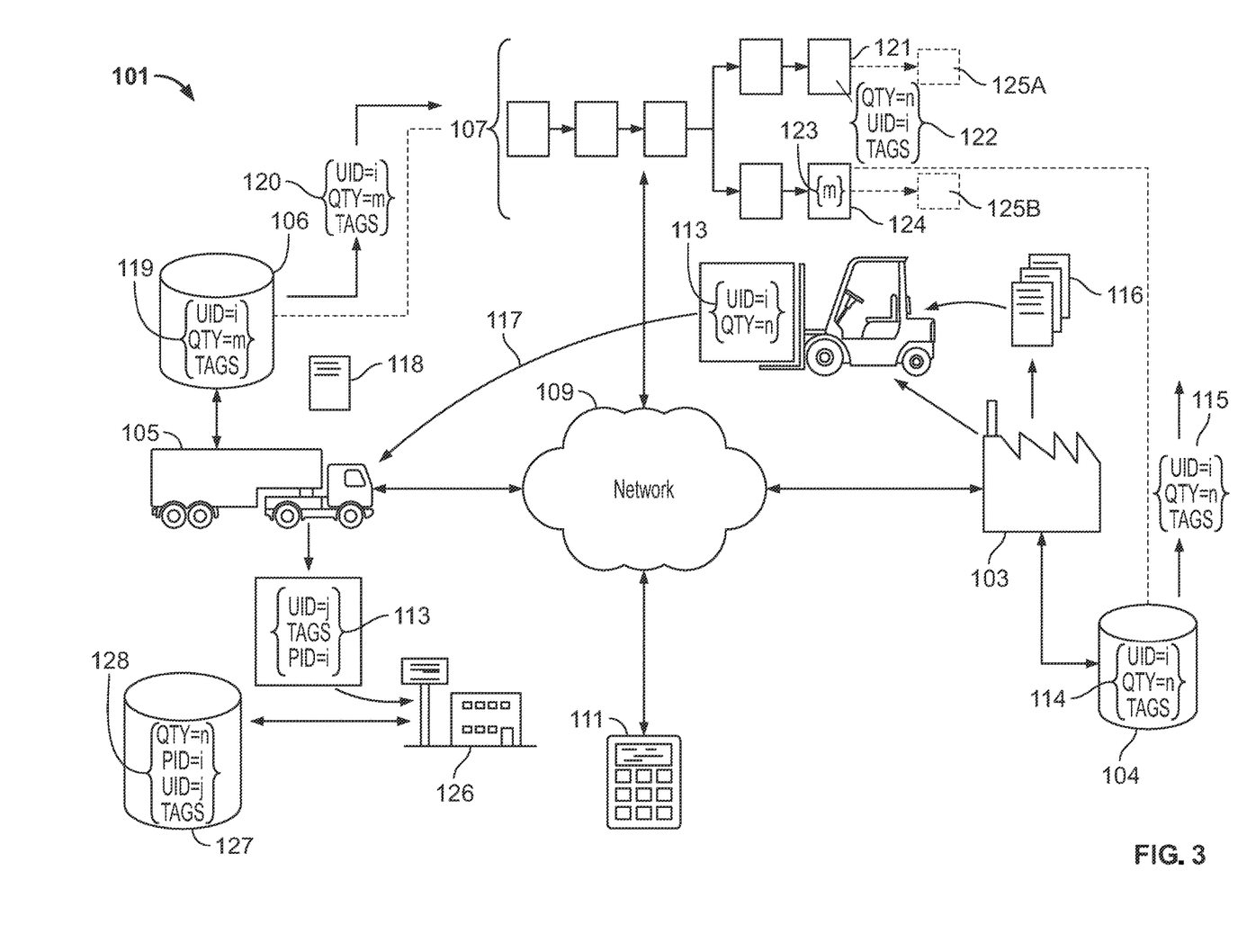
FIG. 3 depicts a further embodiment of a blockchain network according to the present disclosure having a plurality of conflicting transactions.

In the depicted embodiment of FIG. 3, one block (121) contains the data (122) received from the manufacturer's (103) node (e.g., quantity=n), and a second block (124) in a soft fork contains the data (123) received from the shipper's (105) node (e.g., quantity=m). In this situation, two forks of the blockchain (107) exist, each containing a different version of this transaction. However, subsequent potential blocks (125A) and (125B) can continue to be built off of each fork while the system awaits confirmation of which of the these two soft forks should be accepted.

In the exemplary embodiment of FIG. 3, this confirmation is received from a third node, in this case, a retailer (126), which receives the shipment of products (113) from the shipper (105), and records in its own independent, private database (127) the receipt of a quantity of n products (128). Per the blockchain protocol, the retailer (126) attempts to write this value to the blockchain (107). Once the manufacturer (103) and shipper (105) receive this proposed related transaction, both can, in accordance to the applicable collision resolution rules, accept n as the correct value, based on independent third party confirmation produced by the retailer (126). The top-shown fork of the blockchain (107) containing n is thus validated and accepted, the next block (125A) derived from the accepted block (121) is then selected for further processing and validation, and the bottom-shown fork of the blockchain (107) is simply discarded. This process can repeat itself within a fork, resulting in multiple forks and branches reflecting different possible combinations of potentially correct data.

The above example is illustrative only, and not limiting, and should be understood as demonstrating how consensus might be formed. Although in this exemplary embodiment, a single additional data point confirming one of the two numbers was sufficient, other thresholds may apply in a given embodiment. For example, an embodiment may require more than a single subsequent transaction before the algorithm requires that the consistent values be accepted.

Additionally, or alternatively, the system might only accept or prefer values received from specific nodes associated with specific types of firms. For example, in the illustrative embodiment of FIG. 3, if the shipper (105) itself later provided a quantity of n for the products it delivered to the retailer (126), then the shipper (105) itself recognizes the correct number is n, and this post-hoc agreement with the manufacturer's (103) number may be sufficient to accept n as the correct value.

Maintaining a large data space of potential combinations of correct data may quickly grow cumbersome. If a large number of branches within branches are created, the size of the potential blockchain space may grow exponentially, and it may become computationally expensive and impractical to simultaneously maintain the branches. Thus, in an embodiment, this technique may be subject to external limitations. For example, the technique may be time-limited, in that if subsequent transaction data sufficient to confirm the correct number is not received within a certain amount of time or by a certain deadline, another technique is used to determine the correct number. Also by way of example, the technique may be block-limited, in that if subsequent transaction data sufficient to confirm one of the two numbers is not received before a certain number of subsequent potential blocks (125A) and (125B) have been processed, another technique is used to determine the correct number.

These techniques can present the potentially problematic situation where a number is accepted but later conclusively shown to be inaccurate, such as due to subsequent transactions or a manual audit. In such situations, a hard fork may be used to select the correct data. Alternatively, such bounding techniques may be forestalled where a given data point is flagged as critical or otherwise requiring a higher standard for acceptance.

In an embodiment, collisions may be resolved by consent. In such an embodiment, all firms (103) and (105) subject to the conflicting data may receive a notice of the conflict and one or more may be asked to simply accept and consent to the other firm's (103) and (105) number. This method of resolution may be applicable where the correct number is of critical importance to one firm but not another, or where the cause or reasons for the disparity is readily apparent to the firms (103) and (105) and easily resolved by agreement (e.g., a typographical error in entering data into one of the private databases (104) or (106)).

In another embodiment, the firms (103) and (105) may be presented the option of choosing neither data point but rather consenting to a negotiated or mediated alternative. That is, if neither firm (103) and (105) is willing to agree to the data proposed by the other (i.e., neither m nor n), there may be circumstances under which both (103) and (105) are willing to accept a third value (e.g., k). In such circumstances, the consented value is placed on the blockchain (107) and accepted as correct.

In an embodiment, collisions may be resolved by audit. Audits may be performed by an auditor (111) on the blockchain (107). The auditor (111) node may operate manually, automatically, and/or a combination of the two. Generally, the auditor (111) examines the available supporting documentation (116) or (118) for the competing numbers and determines which is better supported. For example, if the supporting documentation (116) and (118) for both the manufacturer (103) and shipper (105) reflects the quantity n, then the value m in the shipper's database (106) may simply by a typographical error, and the value n may be chosen. In an embodiment, this type of resolution may result in an alert, message, or other notice being sent to the shipper (105) to flag the erroneous data.

The system may also combine the various types of consensus-formation. For example, the auditor (111) may determine whether there is any disparity in the firms' (103) and (105) respective supporting documentation (116) and (118) and, if not, notify both firms that their documentation consistently indicates the same correct value, and prompt the firms (103) and (105) to consent to the use of that value.

The auditor (111) may perform the audit manually, such as by use of a human auditor manually reviewing the supporting data, but it is preferred that an AI be trained with one or more models for evaluating supporting data with respect to various transactions or transaction types. The AI can then examine all sets of available supporting data and generate a confidence rating for each of the competing numbers. If only one number is above a certain minimum confidence threshold, it may be chosen. If more than one or none are, the matter may require referral to another consensus technique, such as manual audit or consent. The AI may be continually trained by the results of manual audits. The audit function may be administered and managed by one or both firms (103) and (105), but is preferably by provided by an audit specialist (111), such as an accounting firm or other neutral professional.

The auditor (111) is another node on the blockchain and may receive some or all proposed transactions. That is, in some embodiments, the auditor (111) may receive only disputed transactions requiring the audit function, or may receive all transactions. It is generally preferred the auditor (111) receive all transactions and accompanying supporting documentation, even if there is no disagreement, so that the AI auditor (111) be trained using it. In an embodiment, the AI may be trained with additional data other than data used within the blockchain network. For example, collections of publicly available market data may be used to train and test the AI model for a given type of transaction or date quantification.

In an embodiment, collisions may be resolved by a transaction fee or bidding process. In such circumstances, when a collision is detected, the parties may be notified and may be permitted to offer or add a transaction fee to its proposed number. If the other party consents to the bidding party's proposed number, the consenting party receives the transaction fee from the bidding party. In this fashion, the parties can place a discrete and quantified value on their proposed data, reflecting the degree to which the acceptance of such data is preferred. If one party heavily prefers a value for a particular transaction and another does not, the transaction fee may encourage and incentivize prompt voluntary consensus.

In an embodiment, collisions may be resolved by endorsement. In such circumstances, the approval of a specific node, or group of nodes, may be required before a transaction or block may be validated. For example, a transaction may be flagged as requiring an endorsement from the auditor (111) (whether human or AI), or by a specific node, without which the transaction simply cannot be approved. Once all required endorsements are received, the transaction is considered valid and be accepted. This may alternatively be done at the block level instead of the transaction level, such as by having the auditor (111) (whether human or AI) confirm all transactions in the block. If done by an AI, the auditor (111) may provide a confidence score for the validity of the transaction or block, which might be acceptable only if the score exceeds a predetermined threshold. Alternatively, or additionally, even if a transaction or block does not reach or exceed the threshold confidence level, it may be approved by manual endorsement.

The above examples are exemplary and non-limiting and the systems and methods described herein are applicable to all types of enterprises and not limited to manufacturers, shippers, and retailers. Further, the consensus-forming aspect is not limited to a bilateral dispute. As shown in the FIGS., the blockchain (107) may have well more than two nodes, and a given proposed transaction may implicate the data of more than two such nodes. In such circumstances, three or more competing data points may be available, and may conflict, or consensus may be required of a plurality of nodes regardless. In such circumstances, even further consensus-forming processes may be used. For example, if a given transaction has nine proposed data representations and eight of them agree, the one outlier is most likely incorrect.

It should be further noted that the systems and methods described herein are applicable to multiple divisions or operational units within a single firm or enterprise, and will effectively function in the same fashion. By way of example and not limitation, businesses often have multiple different internal databases to track information and data, and data is often duplicated between and among those databases. An enterprise may have an HR system to track employees, a time tracking system to monitor hours worked, and a payroll system to manage taxes and compensation. All of these systems use overlapping information about employees. Further, employee data in these systems, such as employee numbers, may be used by other systems where employees can be associated with other data, such as document management systems. Transactions and exchanges of metadata often take place between and among such systems, which each store a representation of the data in a different format. The systems and methods provided herein may be used within or between firms to synchronize such systems and provide a shared operational view of any type of data, and is not necessarily limited to transactional data.

One technical challenge to implementing these system and methods is identifying collisions. That is, each node in the blockchain network receiving a request to write a transaction to the current block must be able to identify whether that request conflicts with any other. In a public blockchain, like Bitcoin, this process is simplified because the purpose of the blockchain is to generate and transfer a digital currency, and thus little program logic is needed beyond confirming that the source of the proposed transaction has a sufficient balance of cryptocurrency to complete the proposed transaction. Here, this is not sufficient to identify a collision.

By way of example and not limitation, returning to the illustrative embodiments discussed elsewhere herein, it may be possible to confirm whether the proposed transaction involving an inventory of n products (113) is possible by referring back to prior transactions involving the same data. For example, if a node can determine that the only records in the blockchain (107) for the quantification (i.e., at issue amount of inventory of products (113) available) reflects a number less than n, then a proposed new transaction involving n units is, on its face, impossible. This suggests either that additional inventory has been acquired or produced, but not yet posted to the blockchain (107), or that the quantity n is an error. However, the blockchain (107) must be able to determine what previously posted transactions represent the same quantification of real-world operational information. This may be done through the use of data tagging, which uses computer codes and/or unique identifiers in a shared language or schema to tag and identify different types of data, or data quantifications, often with human-readable labels. Transaction data may be associated with such tags, as shown.

For example, when the blockchain (107) is first deployed, the manufacturer (103) may post a multitude of transactions providing baseline data about its initial operational state, and that data may include an entry quantifying its current inventory of the product (113) referenced in the illustrative examples herein. As with other transactions, this number may be confirmed, audited, or certified in accordance with a consensus-forming process. In the case of initial baseline data, more deference may be given to the source node. The transaction may include a data tag indicating which data quantification this transaction data represents (e.g., a unique identifier within the system indicating to all participants that the number posted represents the on-hand inventory of products (113)). Thus, when another transaction involving that same quantification is posted, the same tag or identifier can be used (by any node in the network) to communicate to other nodes which quantification is being altered. In this fashion, each node can assess whether the proposed new transaction presents a collision with existing data (e.g., the transaction proposes to dispose of a larger number of products than the block indicates to exist).

Similar data tagging techniques may be used to identify when multiple competing transactions represent the same logical transaction. For example, when the manufacturer (103) in the above example posts a transaction purporting to transfer n units to the shipper (105), and the shipper (105) posts a transaction purporting to receive m units from the manufacturer (103), each node should be able to determine that these postings are not merely representative of the same underlying quantifications, but of the same transaction. This is particularly important where there may be a high volume of transactions involving a given quantification. For example, if the manufacturer (103) sends frequent shipments via the shipper (105), there may be multiple unvalidated transactions posted by both the manufacturer (103) and shipper (105), but no way to determine which postings by one firm correspond to which postings by the other to identify a collision.

To address this, transactions may also be tagged with identifiers, preferably a unique identifier or effectively unique identifier, represented in the FIGS. as UID i. This removes ambiguity by allowing each node to conclusively determine the intended meaning of the data represented in the transaction, and to match any one given attempt to post a transaction to all other attempts to represent the same transaction. This unique identifier may also be stored with the final approve transaction on the blockchain (107), and may also be pulled back into and recorded in the individual private databases of the enterprises. This may assist with later audit and review, as well as granular tracking of line item transactional activity.

However, this presents additional difficulties with chains of related transactions. For example, when the shipper (105) in the above example delivers the products (113) to the retailer (126), this constitutes a new and different transaction, and it accordingly receives its own unique identifier, j. However, nodes then cannot use the identifier j to determine that this transaction is related to the prior transaction, i, and leverage the data in transaction j to confirm which of two competing values in transaction i is correct. There are a number of ways to remedy this.

One such way is to include additional data about related transactions, such as a series of parent transactions in a chain of related transactions pertaining to the quantification in question. In the depicted embodiment, this is done using a parent identifier, or "PID," which is a reference to the unique identifier of the immediately prior transaction pertaining to the same quantification. Any given node could thus check the PID of a given transaction to compare to its parent transaction, and check the PID of that parent transaction to go back further into the transactional chain as needed. In an embodiment, a transaction may have multiple parent transactions.

Other types of data tagging may also, or alternatively, be used. Of note, data tagging can be used to connect the granular elements of the transactional data to high-level business documentation, such as financial reports, where transactional data is summarized and assigned human-readable labels. Examples include financial data such as gross revenue, net profits, by segment, product, category, business vertical, region, channel, end market, consumer, historical operating costs segregated by type and as a percentage of revenue, financial contribution and margins by segment. A tagging taxonomy can thus group transactions and tie them to summarized data. An example of a language or schema for implementing this type of data tagging is the eXtensible Business Reporting Language, or XBRL. The taxonomy for a particular embodiment will vary depending on the particular needs of the participating firms, but any type of tagging structure may be utilized, including flat tagging and hierarchical tagging taxonomies.

Such data tagging may be further utilized to connect the granular transactional and financial data to other metrics, such as program-based growth and efficiency impacts and outcomes. These can be extended to include the translation of those impacts to EBITDA, valuation, and equity, as effected by those programs, again, fully auditably at the granular level of the tags.

The systems and methods described herein may be carried out on various types of blockchains, but will generally use a private blockchain system due to the nature of the data being shared. Unlike a public blockchain (e.g., like Bit-Coin), where consensus is derived from all participating nodes based on an algorithmic paradigm, such as "proof of work" or "proof of stake," private blockchains are limited to selected participants and the data processed and shared via the private blockchain is not accessible to the general public. Because the participants on the blockchain are selected for participation and approved in advance, there is less need to secure the blockchain against manipulation and misconduct. For example, financial incentives for participation, such as mining units of a digital currency, are generally not necessary, and misbehaving participants can be removed from participation and have their access revoked. This also allows private blockchains to achieve better performance and reduced resource consumption, as there is little need for computationally-intensive algorithms such as "proof of work" to enforce good behavior.

A federated blockchain is a private blockchain which shares some characteristics of public blockchains, such as decentralization and the absence of a sole authority, but instead of requiring a general public consensus, consensus is only required among a usually small number of participating nodes, each of which has some commercial or relationship incentive to cooperate and behave well. Generally, each firm participating in a federated blockchain is represented by a single node, which is authorized by the firm to make changes to the blockchain network.

The systems and methods described herein can also be used to granularly track and maintain data pertaining any operational data elements of an enterprise, including, but not necessarily limited to, sales, operations and market share. These and other drivers impact the private equity in the enterprise. Changes to any one granular element may have a corresponding impact on created equity. Thus, the systems and methods described herein make it possible to implement programs and procedures intended to improve overall enterprise performance, and to measure and assess the impact of those programs and procedures on enterprise performance and, correspondingly, created equity.

Each granular element of any stasis or program activity of any programmatic impact or outcome in EBITDA and market share is forensically audit-trailed, carried forward and mass-collaborated to cast forward looking valuation and equity growth from an initial base valuation and equity base point, and affirmed by authenticated trailing data maintaining the true state of the information among the collaborating parties. All aligned financial and operational partners may then have some control over how their corporate financial elements and associated data circulate within the blockchain network.

The systems and methods also facilitate management of the relationship between EBITDA and market share, and the created equity directly therefrom. The systems and methods are suitable for use on existing blockchain systems, and may be suitable for use in future developed blockchain systems as well. The systems and methods are suitable for use by node masters in private company and private equity, banking, investment banking, international finance, insurance, transaction, due diligence, and regulatory environments with any encrypted node relationship, and tied materially to equity-creating drivers in private company sales, operations, market share and growth rates.

New participants (internal or external) in the enterprise can be added to and participate in the system as needed, and deprecated participants can be removed from the system without impacting the existing blockchain and approved blocks. Within an enterprise, the systems and methods facilitate the easy, auditable segregation of individual functions and related outcomes, which are materially tied directly to created equity. The enterprise equity itself can be auditably segregated between equity created via a program, as opposed to equity created from other sources (e.g., organic growth).

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for resolving data collisions on a blockchain comprising:
   providing a blockchain network comprising a blockchain operating in accordance with a set of consensus formation rules;
   providing a first node of a first firm, said first node being a node of said blockchain network communicably coupled to a first firm database comprising transactional data for said first firm;
   providing a second node of a second firm, said second node being a node of said blockchain network communicably coupled to a second firm database comprising transactional data for said second firm;
   providing an audit node of an artificial intelligence (AI) auditor module, said audit node being a node of said blockchain network and said AI auditor module comprising a plurality of AI models, each AI model in said plurality of AI models trained to audit transactional data for a type of quantification;
   said first node posting to said blockchain network a first data representation of a transaction between said first firm and said second firm, said first data representation comprising:
      a first value of said transaction selected from said first firm database;
      a unique identifier of said transaction;
      a unique identifier of a parent transaction for said transaction; and
      a data tag for a quantification associated with said transaction;
   said second node posting to said blockchain network a second data representation of said transaction, said second data representation comprising:
      a second value of said transaction selected from said second firm database;
      said unique identifier of said transaction;
      said unique identifier of said parent transaction for said transaction; and
      said data tag for said quantification associated with said transaction;
   receiving, at said first node, said second data representation;
   receiving, at said second node, said first data representation;
   receiving, at said audit node, said first data representation and said second data representation; and
   at each of said first node, said second node, and said audit note, selecting one of said first data representation and said second data representation for inclusion on said blockchain, said selecting using said consensus formation rules.

2. The method of claim 1, wherein said selecting using said consensus formation rules comprises:
   determining whether said first value differs from said second value; and
   if said determining determines that said first value does not differ from said second value, selecting either said first data representation or said second data representation for inclusion on said blockchain.

3. The method of claim 2, wherein said determining determines that said first value differs from said second value.

4. The method of claim 3, wherein said selecting using said consensus formation rules further comprises:
   said first node transmitting to said blockchain network an indication of first node consenting to said second value; and
   selecting said second data representation for inclusion on said blockchain.

5. The method of claim 3, wherein said selecting using said consensus formation rules further comprises:

said second node transmitting to said blockchain network an indication of second node consenting to said first value; and selecting said first data representation for inclusion on said blockchain.

6. The method of claim 3, wherein:

said consensus formation rules comprise an endorsement by said AI audit module; and said selecting using said consensus formation rules further comprises:

at said audit node, said AI audit module transmitting to said blockchain network an indication of said AI audit module's endorsement of said first data representation; and     selecting said first data representation for inclusion on said blockchain.

7. The method of claim 6, further comprising, before said AI audit module transmitting to said blockchain network an indication of said AI audit module's endorsement of said first data representation:

said AI audit module receiving a first set of image data comprising images of supporting documentation for said first data representation;

said AI audit module generating a first confidence score for said first data representation, said first confidence score based on said received first set of image data;

said AI audit module receiving a second set of image data comprising images of supporting documentation for said second data representation;

said AI audit module generating a second confidence score for said second data representation, said second confidence score based on said received second set of image data.

8. The method of claim 7, wherein said AI audit module transmits to said blockchain network an indication of said AI audit module's endorsement of said first data representation only if said first confidence score exceeds a predefined minimum confidence threshold and only if said second confidence score does not exceed said predefined minimum confidence threshold.

9. The method of claim 3, wherein said selecting using said consensus formation rules further comprises determining to compare said first data representation and second data representation from among a plurality of data representations, said plurality including said first data representation and second data representation, by comparing said unique identifier of said transaction in each of said first data representation and second data representation.

10. The method of claim 3, wherein said selecting using said consensus formation rules further comprises determining to compare said first data representation and second data representation from among a plurality of data representations, said plurality including said first data representation and second data representation, by comparing said data tag for said quantification associated with said transaction in each of said first data representation and second data representation.

11. The method of claim 3, wherein said selecting using said consensus formation rules further comprises:

creating a first fork on said blockchain, said first fork including a block comprising said first data representation and said block not comprising said second data representation; and creating a second fork on said blockchain, said second fork including a block comprising said second data representation and said block not comprising said first data representation.

12. The method of claim 11, further comprising:

providing a third node of a third firm, said third node being a node of said blockchain network communicably coupled to a third firm database comprising transactional data for said third firm;

said third node posting to said blockchain network a data representation of a second transaction, said data representation comprising:

a first value of said second transaction selected from said third firm database;

a unique identifier of said second transaction;

a unique identifier of a parent transaction for said second transaction, said parent transaction being said transaction and said unique identifier of said parent transaction being said unique identifier of said transaction; and     a data tag for a quantification associated with said second transaction;

receiving, at said first node, said data representation;

receiving, at said second node, said data representation;

receiving, at said audit node, said data representation; and said selecting one of said first data representation and said second data representation for inclusion on said blockchain, said selecting using said consensus formation rules further comprising:

comparing said unique identifier of said parent transaction for said second transaction to said unique identifier of said transaction in said first data representation and said second data representation;

based on said comparing, determining that said transaction is a parent transaction of said second transaction;

only if said value for said second transaction in said data representation is equal to said first value in said first data representation, continuing said first fork and discontinuing said second fork; and     only if said value for said second transaction in said data representation is equal to said second value in said second data representation, continuing said second fork and discontinuing said first fork.

13. The method of claim 3, wherein said set of consensus formation rules includes a transaction fee bidding rule.

14. The method of claim 13, wherein:

said first data representation further comprises a transaction fee amount for said first data representation;

said selecting using said consensus formation rules further comprises:

said second node transmitting to said blockchain network an indication of second node consenting to said first value; and     selecting said first data representation for inclusion on said blockchain;

and said second firm receiving said transaction fee.

15. The method of claim 13, wherein:

said second data representation further comprises a transaction fee amount for said second data representation;

said selecting using said consensus formation rules further comprises:

said first node transmitting to said blockchain network an indication of first node consenting to said second value; and     selecting said second data representation for inclusion on said blockchain;

and said first firm receiving said transaction fee.

16. The method of claim 13, wherein:

said first data representation further comprises a first transaction fee amount for said first data representation;

said second data representation further comprises a second transaction fee amount for said second data representation; and said selecting using said consensus formation rules further comprises:
- only if said first transaction fee amount is greater than said second transaction fee amount, selecting said first data representation for inclusion on said blockchain and said second firm receiving said first transaction fee; and
- only if said second transaction fee amount is greater than said first transaction fee amount, selecting said second data representation for inclusion on said blockchain and said first firm receiving said second transaction fee.

17. The method of claim 3, wherein said set of consensus formation rules includes two or more members of a group consisting of: comparison to prior accepted block data; comparison to later arriving block data; consent; manual audit; artificial intelligence audit; transaction fee bidding; endorsement; and proof-of-vote.

18. The method of claim 1, wherein said blockchain network operates via a telecommunications network.

19. The method of claim 1, wherein said blockchain network is a private blockchain network.

20. The method of claim 1, wherein said blockchain is selected from a group consisting of: a federated blockchain; a consortium blockchain; and a hybrid blockchain.

\* \* \* \* \*